US012637934B1

(12) United States Patent
Schuh et al.

(10) Patent No.: US 12,637,934 B1
(45) Date of Patent: May 26, 2026

(54) TORQUE CONTROL WITH A SLIP DEVICE FOR PRESSURE TESTING A HYDRAULIC FRACTURING SYSTEM

(71) Applicant: Caterpillar Inc., Peoria, IL (US)

(72) Inventors: David J Schuh, Peoria, IL (US); Jared M Kirk, Peoria, IL (US); Karuna Kumari Vutukuru, San Jose, CA (US); Rodney Dale Harms, Houston, TX (US); Todd Ryan Kabrich, Tombell, TX (US); Yuesheng He, Sugar Land, TX (US); Catrina Elizabeth Swan, Peoria, IL (US); Raghunandan Madhava, Dunlap, IL (US); Kevin Schmidt, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/962,971

(22) Filed: Nov. 27, 2024

(51) Int. Cl.
*E21B 43/26* (2006.01)
*F16H 61/14* (2006.01)

(52) U.S. Cl.
CPC ....... *E21B 43/2607* (2020.05); *F16H 61/143* (2013.01); *F16H 2061/145* (2013.01)

(58) Field of Classification Search
CPC ............... E21B 43/2607; F16H 61/143; F16H 2061/145
See application file for complete search history.

(56) References Cited

U.S. PATENT DOCUMENTS

| | | | |
|---|---|---|---|
| 4,398,360 A | 8/1983 | Kessler | |
| 9,670,972 B2 | 6/2017 | Smith et al. | |
| 10,227,752 B2 | 3/2019 | Naud et al. | |
| 11,661,831 B2 | 5/2023 | Chapman et al. | |
| 2022/0018234 A1* | 1/2022 | Reddy ..................... | F04B 23/04 |
| 2023/0258172 A1* | 8/2023 | Clark .................. | E21B 43/2607 417/43 |
| 2023/0340866 A1 | 10/2023 | Aune et al. | |

FOREIGN PATENT DOCUMENTS

| | | |
|---|---|---|
| CN | 203463092 U | 3/2014 |
| CN | 205330645 U | 6/2016 |
| CN | 216043670 U | 3/2022 |

* cited by examiner

*Primary Examiner* — Crystal J Lee
(74) *Attorney, Agent, or Firm* — Foley & Lardner (DC)

(57) ABSTRACT

A hydraulic fracturing pump system may include a hydraulic fracturing pump, a gaseous fuel engine configured to drive the hydraulic fracturing pump, a slip device selectively coupling the hydraulic fracturing pump with the gaseous fuel engine, a gear system mechanically coupled to the hydraulic fracturing pump between the hydraulic fracturing pump and the slip device, and a controller. The controller may be configured to cause, in connection with a pressure test for a hydraulic fracturing system that includes the hydraulic fracturing pump system, a slip engagement of the slip device to control an output torque to, and a discharge pressure of, the hydraulic fracturing pump.

15 Claims, 3 Drawing Sheets

310

Receive an indication to initiate a pressure test for the hydraulic fracturing system

320

Determine a combination of a gear ratio for the gear system and a slip speed for the slip engagement of the slip device that provides an output torque

330

Cause the gear system to engage the gear ratio

340

Cause the slip engagement of the slip device in accordance with the slip speed

300

TORQUE CONTROL WITH A SLIP DEVICE FOR PRESSURE TESTING A HYDRAULIC FRACTURING SYSTEM

TECHNICAL FIELD

The present disclosure relates generally to hydraulic fracturing systems and, for example, to torque control with a slip device for pressure testing a hydraulic fracturing system.

BACKGROUND

Hydraulic fracturing is a well stimulation technique that typically involves pumping hydraulic fracturing fluid into a wellbore at a rate and a pressure (e.g., up to 15,000 pounds per square inch (psi)) sufficient to form fractures in a rock formation surrounding the wellbore. This well stimulation technique often enhances the natural fracturing of a rock formation to increase the permeability of the rock formation, thereby improving recovery of water, oil, natural gas, and/or other fluids. A hydraulic fracturing pump (or a "well stimulation pump") may be powered by a diesel engine or a diesel/natural gas dual-fuel engine (e.g., a dynamic gas blending (DGB) engine). However, diesel engines and diesel/natural gas dual-fuel engines are associated with high levels of greenhouse gas emissions and high fuel costs.

Gaseous fuels, such as natural gas, may be less expensive than other hydrocarbon fuels, more readily available in remote areas, and may burn relatively cleaner during operation. A typical gaseous fuel internal combustion engine differs from a traditional, liquid fuel internal combustion engine primarily in that a gaseous fuel (e.g., methane, natural gas, ethane, and/or propane) is burned in the engine rather than an atomized mist of liquid fuel from a fuel injector or carburetor. Most gaseous fuel engines operate using spark ignition by a conventional spark plug. While gaseous fuel engines have a number of benefits, gaseous fuel engines generally operate at a single speed, resulting in difficulties associated with using gaseous fuel engines with the pumps of hydraulic fracturing systems.

For example, to test a hydraulic fracturing system for leaks, one or more pumps are brought on, while the system is sealed, to increase a pressure in the system to a target testing pressure. Using diesel engines to power the pumps in such a testing scenario is straightforward because diesel engines have variable speed capability suitable for controlling powertrain output torque in accordance with a target pressure for a pressure test. However, gaseous fuel engines are unable to control powertrain output torque in a similar manner as diesel engines due to having only single speed capability.

U.S. Patent Application Publication No. 20230340866 (the '866 publication) discloses a driveline including a transmission with shiftable gears that connects a reciprocating gas engine with a hydraulic pump configured for use in oilfield hydraulic fracturing operations. The '866 publication additionally discloses a control system that is configured with programmatic instructions for operating a dual electric machine that alters torque emanating from the reciprocating gas engine to facilitate upshifting of gears in the transmission. The '866 publication does not disclose techniques relating to pressure testing a hydraulic fracturing system.

The hydraulic fracturing pump system of the present disclosure solves one or more of the problems set forth above and/or other problems in the art.

SUMMARY

A hydraulic fracturing system may include one or more fluid conduits, and a hydraulic fracturing pump system fluidly coupled to the one or more fluid conduits. The hydraulic fracturing pump system may include a hydraulic fracturing pump, a gaseous fuel engine configured to drive the hydraulic fracturing pump, a torque converter including an impeller clutch that selectively couples the hydraulic fracturing pump with the gaseous fuel engine, a gear system mechanically coupled to the hydraulic fracturing pump between the hydraulic fracturing pump and the torque converter, and a controller. The controller may be configured to cause, in connection with a pressure test for the hydraulic fracturing system, a slip engagement of the impeller clutch to control an output torque to, and a discharge pressure of, the hydraulic fracturing pump.

A hydraulic fracturing pump system may include a hydraulic fracturing pump, a gaseous fuel engine configured to drive the hydraulic fracturing pump, a slip device selectively coupling the hydraulic fracturing pump with the gaseous fuel engine, a gear system mechanically coupled to the hydraulic fracturing pump between the hydraulic fracturing pump and the slip device, and a controller. The controller may be configured to cause, in connection with a pressure test for a hydraulic fracturing system that includes the hydraulic fracturing pump system, a slip engagement of the slip device to control an output torque to, and a discharge pressure of, the hydraulic fracturing pump.

Some examples described herein relate to a method of pressure testing a hydraulic fracturing system including a hydraulic fracturing pump, an engine configured to drive the hydraulic fracturing pump, and a slip device selectively coupling the hydraulic fracturing pump with the engine. The method may include receiving, by a controller, an indication to initiate a pressure test for the hydraulic fracturing system, and causing, by the controller in connection with the pressure test for the hydraulic fracturing system, a slip engagement of the slip device to control an output torque to, and a discharge pressure of, the hydraulic fracturing pump.

DETAILED DESCRIPTION

This disclosure relates to a hydraulic fracturing pump system, which is applicable to any hydraulic fracturing system or other system that pressurizes fluids.

Figure 1:
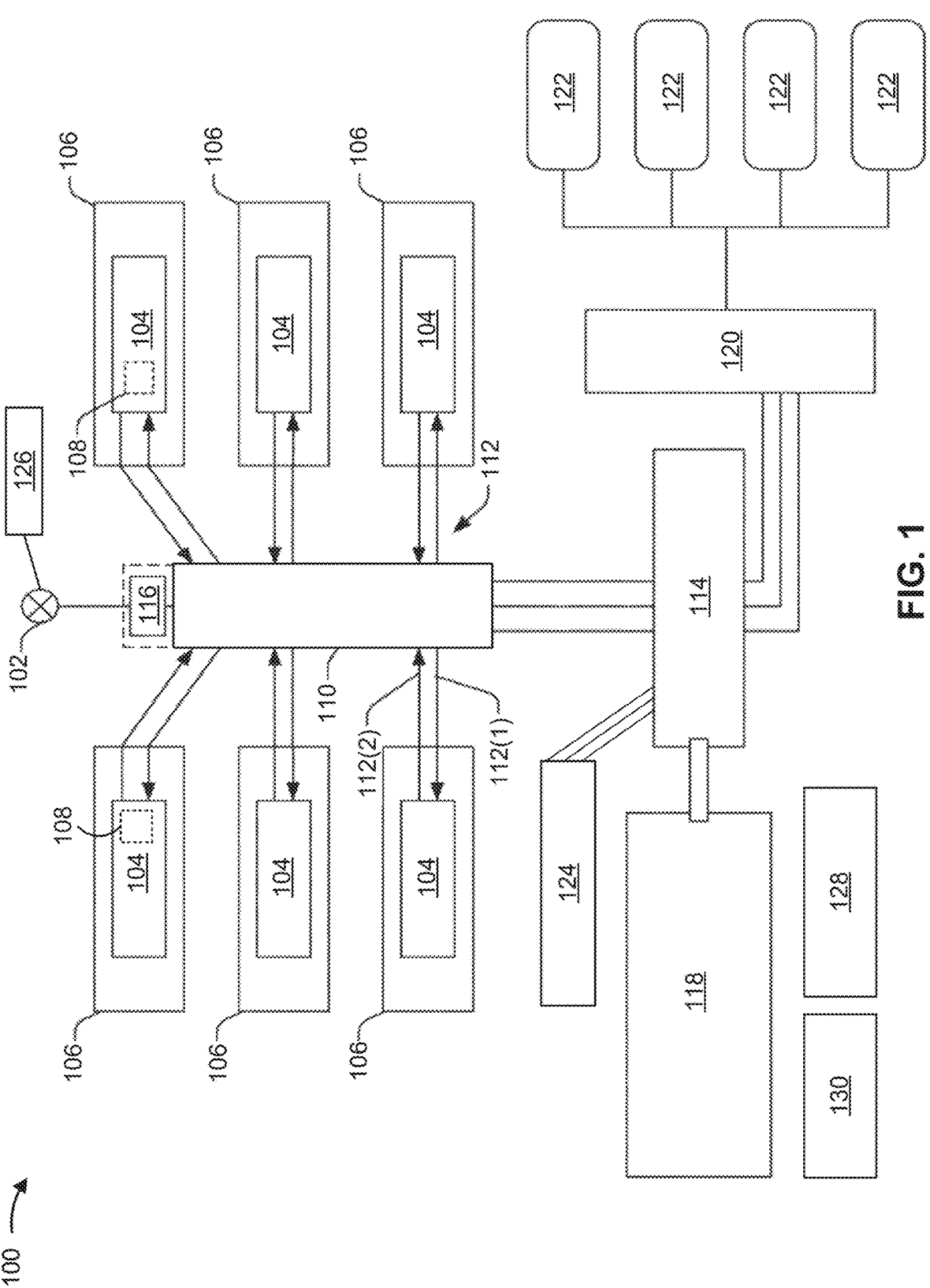
FIG. 1 is a diagram illustrating an example hydraulic fracturing system.

FIG. 1 is a diagram illustrating an example hydraulic fracturing system 100. For example, FIG. 1 depicts a plan view of an example hydraulic fracturing site along with equipment that is used during a hydraulic fracturing process. In some examples, less equipment, additional equipment, or alternative equipment to the example equipment depicted in FIG. 1 may be used to conduct the hydraulic fracturing process.

The hydraulic fracturing system 100 includes a well 102. Hydraulic fracturing is a well-stimulation technique that uses high-pressure injection of fracturing fluid into the well 102 and corresponding wellbore in order to hydraulically fracture a rock formation surrounding the wellbore. While the description provided herein describes hydraulic fracturing in the context of wellbore stimulation for oil and gas production, the description herein is also applicable to other uses of hydraulic fracturing.

High-pressure injection of the fracturing fluid may be achieved by one or more pump systems 104 (e.g., hydraulic fracturing pump systems) that may be mounted (or housed) on one or more hydraulic fracturing trailers 106 (which also may be referred to as "hydraulic fracturing rigs") of the hydraulic fracturing system 100. Each of the pump systems 104 includes at least one fluid pump 108 (referred to herein collectively, as "fluid pumps 108" and individually as "a fluid pump 108"). The fluid pumps 108 may be hydraulic fracturing pumps. The fluid pumps 108 may include various types of high-volume hydraulic fracturing pumps, such as triplex or quintuplex pumps. Additionally, or alternatively, the fluid pumps 108 may include other types of reciprocating positive-displacement pumps or gear pumps. A type and/or a configuration of the fluid pumps 108 may vary depending on the fracture gradient of the rock formation that will be hydraulically fractured, the quantity of fluid pumps 108 used in the hydraulic fracturing system 100, the flow rate necessary to complete the hydraulic fracture, the pressure necessary to complete the hydraulic fracture, or the like. The hydraulic fracturing system 100 may include any number of trailers 106 having fluid pumps 108 thereon in order to pump hydraulic fracturing fluid at a predetermined rate and pressure.

In some examples, the fluid pumps 108 may be in fluid communication with a manifold 110 via various fluid conduits 112, such as flow lines, pipes, or other types of fluid conduits. The manifold 110 combines fracturing fluid received from the fluid pumps 108 prior to injecting the fracturing fluid into the well 102. The manifold 110 also distributes fracturing fluid to the fluid pumps 108 that the manifold 110 receives from a blender 114 of the hydraulic fracturing system 100. In some examples, the various fluids are transferred between the various components of the hydraulic fracturing system 100 via the fluid conduits 112. The fluid conduits 112 include low-pressure fluid conduits 112(1) and high-pressure fluid conduits 112(2). In some examples, the low-pressure fluid conduits 112(1) deliver fracturing fluid from the manifold 110 to the fluid pumps 108, and the high-pressure fluid conduits 112(2) transfer high-pressure fracturing fluid from the fluid pumps 108 to the manifold 110.

The manifold 110 also includes a fracturing head 116. The fracturing head 116 may be included on a same support structure as the manifold 110. The fracturing head 116 receives fracturing fluid from the manifold 110 and delivers the fracturing fluid to the well 102 (via a well head mounted on the well 102) during a hydraulic fracturing process. In some examples, the fracturing head 116 may be fluidly connected to multiple wells.

The blender 114 combines proppant received from a proppant storage unit 118 with fluid received from a hydration unit 120 of the hydraulic fracturing system 100. In some examples, the proppant storage unit 118 may include a dump truck, a truck with a trailer, one or more silos, or other types of containers. The hydration unit 120 receives water from one or more water tanks 122. In some examples, the hydraulic fracturing system 100 may receive water from water pits, water trucks, water lines, and/or any other suitable source of water. The hydration unit 120 may include one or more tanks, pumps, gates, or the like.

The hydration unit 120 may add fluid additives, such as polymers or other chemical additives, to the water. Such additives may increase the viscosity of the fracturing fluid prior to mixing the fluid with proppant in the blender 114. The additives may also modify a pH of the fracturing fluid to an appropriate level for injection into a targeted formation surrounding the wellbore. Additionally, or alternatively, the hydraulic fracturing system 100 may include one or more fluid additive storage units 124 that store fluid additives. The fluid additive storage unit 124 may be in fluid communication with the hydration unit 120 and/or the blender 114 to add fluid additives to the fracturing fluid.

In some examples, the hydraulic fracturing system 100 may include a balancing pump 126. The balancing pump 126 provides balancing of a differential pressure in an annulus of the well 102. The hydraulic fracturing system 100 may include a data monitoring system 128. The data monitoring system 128 may manage and/or monitor the hydraulic fracturing process performed by the hydraulic fracturing system 100 and the equipment used in the process. In some examples, the management and/or monitoring operations may be performed from multiple locations. The data monitoring system 128 may be supported on a van, a truck, or may be otherwise mobile. The data monitoring system 128 may include a display for displaying data for monitoring performance and/or optimizing operation of the hydraulic fracturing system 100. In some examples, the data gathered by the data monitoring system 128 may be sent off-board or off-site for monitoring performance and/or performing calculations relative to the hydraulic fracturing system 100.

The hydraulic fracturing system 100 includes a controller 130. The controller 130 may be a system-wide controller for the hydraulic fracturing system 100 or a pump-specific controller for a pump system 104. The controller 130 may be communicatively coupled (e.g., by a wired connection or a wireless connection) with one or more of the pump systems 104. The controller 130 may also be communicatively coupled with other equipment and/or systems of the hydraulic fracturing system 100.

As indicated above, FIG. 1 is provided as an example. Other examples may differ from what is described with regard to FIG. 1.

Figure 2:
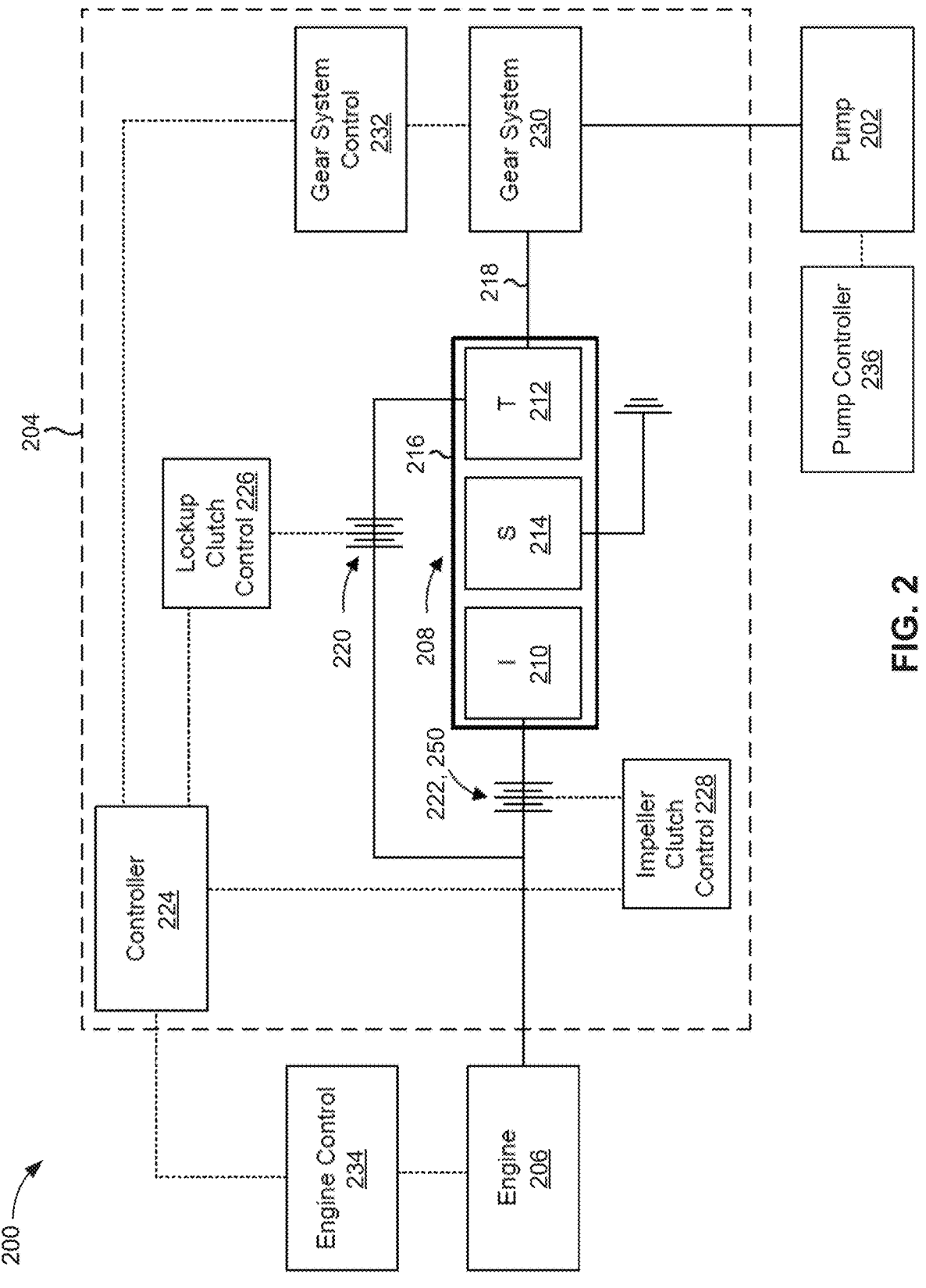
FIG. 2 is a diagram illustrating an example pump system.

FIG. 2 is a diagram illustrating an example pump system 200. The pump system 200 may correspond to a pump system 104, described herein. The pump system 200 includes a powertrain that includes a pump 202, a transmission system 204, and an engine 206. The transmission system 204 may include a torque converter 208 and a gear system 230 (e.g., a planetary gear system).

The pump 202 may be a hydraulic fracturing pump. For example, the pump 202 may correspond to a fluid pump 108, described herein. The gear system 230 is mechanically coupled to the pump 202. The gear system 230 provides multiple gear ratios (or "gears") to allow driving of the pump 202 at various speeds and torques. The transmission system 204 may be a type of automatic transmission. The engine 206 may be a gaseous fuel engine (e.g., an engine operable by spark ignition of a gaseous fuel). The engine 206 may include a crankshaft (not shown), configured for rotation in the engine 206 to rotate a flywheel (not shown). The engine 206 is configured to drive (e.g., provide power to) the pump 202 via the transmission system 204.

The torque converter 208 (e.g., a fluid coupling device) is configured to fluidly couple the engine 206 and the gear system 230. The torque converter 208 includes an impeller 210 (shown as "I" in FIG. 2), a turbine 212 (shown as "T" in FIG. 2), and a stator 214 (shown as "S" in FIG. 2), positioned between the impeller 210 and the turbine 212, within a housing 216. The housing 216 is filled with a fluid (e.g., transmission fluid). In operation, a toroidal fluid flow circuit is created by the impeller 210, the turbine 212, and the stator 214.

The housing 216 is mechanically coupled to the engine 206. For example, the housing 216 may be mechanically coupled to (e.g., mounted on) the flywheel of the engine 206. The turbine 212 is mechanically coupled to the gear system 230. For example, the turbine 212 may be operatively coupled to an output shaft 218 (which may also be referred to as a "transmission input shaft") that is coupled to the gear system 230.

Operation of the engine 206 rotates the housing 216, and the housing 216 transfers rotational forces to the impeller 210 (e.g., which may be coupled to an interior surface of the housing 216). The impeller 210 includes an array of blades that directs fluid toward the turbine 212 in response to rotation of the impeller 210. The turbine 212 is fluidly coupled to the impeller 210. For example, the turbine 212 is hydrodynamically coupled to the impeller 210 so that rotation of the impeller 210 drives the turbine 212. Thus, fluid pumped by the impeller 210 rotates the turbine 212, thereby transferring torque from the engine 206 to the gear system 230. The turbine 212 also includes an array of blades that directs fluid toward the impeller 210 in response to rotation of the turbine 212. The stator 214, positioned between the impeller 210 and the turbine 212, redirects fluid exiting from the turbine 212 toward the impeller 210. The stator 214 also includes an array of blades configured to control a direction of fluid flow exiting from the turbine 212 to align with a direction of the fluid flow with respect to the impeller 210, which produces a torque multiplication effect when the speed of the impeller 210 is significantly higher than the speed of the turbine 212. The stator 214 may be restricted against rotating in an opposite direction of the fluid flow (e.g., via a one-way clutch).

The torque converter 208 includes a lockup clutch 220 and an impeller clutch 222. In some implementations, the gear system 230 and the torque converter 208 (including the lockup clutch 220 and the impeller clutch 222) may be housed together.

The lockup clutch 220 is configured to mechanically couple (e.g., selectively) the engine 206 and the gear system 230 (e.g., via the torque converter 208 without fluid coupling). For example, the lockup clutch 220 may be configured to mechanically couple the turbine 212 to the engine 206. The lockup clutch 220 may be located in the housing 216 (e.g., between the turbine 212 and an interior surface of the housing 216). The lockup clutch 220 may be configured to couple the turbine 212 to the housing 216, such that the housing 216 transfers rotational forces to the turbine 212 during operation of the engine 206. The lockup clutch 220 may be a friction clutch.

The lockup clutch 220 is configured to transition between a disengaged state and an engaged state (e.g., by hydraulic control of the lockup clutch 220). The lockup clutch 220 may be slipped (e.g., partially engaged) when transitioning between engagement and disengagement or between disengagement and engagement. Disengagement of the lockup clutch 220 results in fluid coupling of the engine 206 and the gear system 230 via the torque converter 208. Engagement of the lockup clutch results in mechanical coupling of the engine 206 and the gear system 230 via the torque converter 208. The lockup clutch 220 may be engaged when a speed of the turbine 212 corresponds to (e.g., is substantially the same as) a speed of the impeller 210. Mechanical coupling of the engine 206 and the gear system 230 more efficiently transfers power from the engine 206 to the gear system 230 relative to fluid coupling.

The impeller clutch 222 may be configured to mechanically couple (e.g., selectively) the impeller 210 to the engine 206. The impeller clutch 222 may be located in the housing 216 (e.g., between the impeller 210 and an interior surface of the housing 216). The impeller clutch 222 may be configured to couple the impeller 210 to the housing 216, such that the housing 216 transfers rotational forces to the impeller 210 during operation of the engine 206. The impeller clutch 222 may be a friction clutch. In some implementations, the impeller clutch 222 may include a disc stack of alternating friction discs and separator plates. A piston plate may be positioned on an end of the disc stack. One or more actuators (e.g., hydraulically actuated pistons) may be configured to engage the piston plate to compress the disc stack.

The impeller clutch 222 is configured to transition between a disengaged state and an engaged state (e.g., by hydraulic control of the impeller clutch 222). In some examples, the impeller clutch 222 may have a slip engagement that partially engages the engine 206 and the impeller 210. Disengagement of the impeller clutch 222 results in decoupling of the engine 206 and the gear system 230 (e.g., decoupling of the engine 206 and the impeller 210). Engagement of the impeller clutch 222 results in fluid coupling of the engine 206 and the gear system 230 via the torque converter 208 (e.g., coupling of the engine 206 and the impeller 210). Slipping the impeller clutch 222 partially engages the engine 206 to the pump 202.

Accordingly, the impeller clutch 222 is a slip device 250 of the transmission system 204. For example, the slip device 250 may provide selective coupling (e.g., engagement, disengagement, or a slip engagement) between the engine 206 and the pump 202. Thus, the gear system 230 may be mechanically coupled to the pump 202 between the pump 202 and the slip device 250. In some implementations, the slip device 250 may be another device capable of providing a slip engagement between the engine 206 and the pump 202. For example, the slip device 250 may be a parallel path variable (PPV) transmission, which may be positioned between the engine 206 and the torque converter 208, or may be used in place of the torque converter 208 (the torque converter 208 may be eliminated).

The pump system 200 may include a controller 224. The controller 224 may include one or more electronic control modules (ECMs) associated with the engine 206, the transmission system 204, the gear system 230, and/or the torque converter 208. For example, the controller 224 may be associated with the transmission system 204, as shown. The controller 224 may correspond to the controller 130, described herein. Moreover, the transmission system 204 may include a gear system control 232 for the gear system 230, and the pump system 200 may include an engine control 234 for the engine 206. The gear system control 232 and the engine control 234 may be communicatively coupled with the controller 224.

The controller 224 may include one or more memories and one or more processors communicatively coupled to the one or more memories. A processor may include a central processing unit, a graphics processing unit, a microprocessor, a controller, a microcontroller, a digital signal processor, a field-programmable gate array, an application-specific integrated circuit, and/or another type of processing component. The processor may be implemented in hardware, firmware, or a combination of hardware and software. The processor may be capable of being programmed to perform one or more operations or processes described elsewhere herein. A memory may include volatile and/or nonvolatile memory. For example, the memory may include random access memory (RAM), read only memory (ROM), a hard disk drive, and/or another type of memory (e.g., a flash memory, a magnetic memory, and/or an optical memory). The memory may store information, one or more instructions, and/or software (e.g., one or more software applications) related to the operation of the controller 224.

The controller 224 may be configured to control engagement and disengagement of the lockup clutch 220 and/or the impeller clutch 222. The controller 224 may control engagement and disengagement of the lockup clutch 220 via a first clutch control 226 and/or the controller 224 may control engagement and disengagement of the impeller clutch 222 via a second clutch control 228. The clutch controls 226, 228 may include hydraulic actuators, valves, or the like. For example, the clutch controls 226, 228 may include electronic clutch pressure controls (ECPCs) or other electronically controlled hydraulic valves.

The controller 224 may be configured to perform operations for a pressure test of the hydraulic fracturing system 100. For example, in connection with the pressure test, the controller 224 may cause the pump 202 (or multiple pumps 202) to pressurize the hydraulic fracturing system 100, which may be closed (e.g., sealed), up to a target pressure. At or around the target pressure, the hydraulic fracturing system 100 may be inspected for leaks. For example, fluid conduits (e.g., fluid conduits 112(2) and/or other fluid conduits connecting to the well 102) may be inspected for leaks. At an initiation of the pressure test, a pump controller 236 for the pump 202 may receive an input from an operator commanding initiation of the pressure test and/or indicating a target pressure (e.g., a discharge pressure of the pump 202) for the pressure test. The pump controller 236 may convert the target pressure to a torque requirement (e.g., using a table, a model, or the like), which represents an output torque of the gear system 230 that provides the target pressure from the pump 202.

The controller 224 may receive an indication to initiate the pressure test (e.g., from the pump controller 236, from another controller, as an operator input, or the like). For example, the controller 224 may receive, from the pump controller 236, a torque request indicating the output torque (e.g., the indication to initiate the pressure test includes the torque request). In some implementations, the indication to initiate the pressure test may indicate the target pressure, and the controller 224 may determine the output torque based on the target pressure.

Responsive to the indication to initiate the pressure test, the controller 224 may enter a pressure test mode. The controller 224 may prepare the pump system 200 for the pressure test by causing a park to neutral shift for the gear system 230 and/or by causing disengagement of the slip device 250. For example, to cause disengagement of the slip device 250, the controller 224 may cause depressurization of the impeller clutch control 228 for the impeller clutch 222 (e.g., dropping the pressure to zero). The controller 224 may also cause (e.g., via the engine control 234) the engine 206 to increase its speed from an idle speed to an operating speed for driving the pump 202.

The controller 224 may then determine a plurality of combinations of gear ratios and slip speeds that provide the output torque (e.g., using a table, a model, or the like). Thus, for each gear ratio of the gear system 230, the controller 224 may determine a slip speed to use with that gear ratio that will provide the output torque. In one example, the controller 224 may determine a plurality of combinations of gear ratios, torque converter input speeds (i.e., impeller speeds), and slip speeds that provide the output torque. For example, the controller 224 may determine an input speed for each gear ratio that provides the output torque (e.g., output torque divided by gear ratio), and the controller 224 may determine a torque converter input speed and a slip speed that provides the input speed. "Slip speed" may represent a change in speed across the slip device 250.

After determining the combinations, the controller 224 may determine one or more combinations having slip speeds that fall within a defined speed range (e.g., defined by a lower speed bound and an upper speed bound). The speed range may be defined to promote the slip device 250 having a proper slip engagement while minimizing overheating. The controller 224 may select a combination of a gear ratio and a slip speed (e.g., a combination of a gear ratio, a torque converter input speed, and a slip speed) from the one or more identified combinations. For example, the combination that is selected may have a minimum gear ratio (or a maximum gear ratio) among the one or more identified combinations. In this way, the controller 224 may determine the combination of the gear ratio and the slip speed that provides the output torque.

In connection with the pressure test, the controller 224 may cause a shift for the gear system 230 and/or a slip engagement of the slip device 250, thereby controlling the output torque to the pump 202, and consequently the discharge pressure of the pump 202. For example, the controller 224 may cause the gear system 230 (e.g., via the gear system control 232) to engage the gear ratio of the selected combination. Moreover, the controller 224 may cause the slip engagement of the slip device 250 in accordance with the slip speed of the selected combination. For example, the controller 224 may control a pressurization of the impeller clutch control 228 for the impeller clutch 222 in accordance with the slip speed.

In some examples, the controller 224 may cause the slip engagement of the slip device 250 in multiple stages of decreasing slip speed (e.g., increasing pressurization of the impeller clutch control 228 for the impeller clutch 222). This may provide, over the multiple stages, increasing of the output torque and therefore the discharge pressure of the pump 202 (e.g., up to the target pressure of the pressure test). For example, in a first stage, the controller 224 may cause the slip engagement of the slip device 250 at a first slip speed overage (e.g., the slip speed plus a first higher overage amount). In a second stage, the controller 224 may cause the slip engagement of the slip device 250 at a second slip speed overage lower than the first slip speed overage (e.g., the slip speed plus a second lower overage amount). In a third stage, the controller 224 may cause the slip engagement of the slip device 250 at the slip speed. In this way, the output torque and discharge pressure of the pump 202 is gradually increased to avoid overshooting the target pressure for the pressure test. Although the preceding example describes the multiple stages as three stages, the multiple stages may be two stages or four or more stages.

To cause the slip engagement of the slip device 250 in accordance with the slip speed, the controller 224 may utilize a closed-loop control, such as a proportional-integral-derivative (PID) control, an integrator control, or the like. The closed-loop control may use the slip speed as a set point with an actual slip speed as feedback. For example, the integrator control may integrate a speed error between the slip speed set point and the actual slip speed. As an example, the controller 224 may control the pressurization of the impeller clutch control 228 for the impeller clutch 222 (e.g., by increasing and/or decreasing pressure) in accordance with a difference between the actual slip speed and the slip speed set point. In this way, the controller 224 may maintain the actual slip speed at or near the slip speed set point.

The controller 224 may cause the slip engagement of the slip device 250 until a command to terminate the pressure test is received by the controller 224 (e.g., from the pump controller 236, from another controller, as an operator input, or the like). In some examples, the controller 224 may automatically disengage the slip device 250 (e.g., without receiving a command to terminate). For example, the controller 224 may detect that a temperature of the slip device 250 satisfies a temperature threshold and/or that a duration of the slip engagement of the slip device 250 satisfies a duration threshold. Both the temperature threshold and the duration threshold may be defined to result in disengagement of the slip device 250 when overheating of the slip device 250 is present or likely. As another example, the controller 224 may detect that a discharge pressure of the pump 202 (e.g., reported to the controller 224 by the pump controller 236) is outside of a defined pressure range (e.g., the pump 202 is overpressurized).

The controller 224 may cause disengagement of the slip device 250 (e.g., to exit the pressure test mode) responsive to receiving the command to terminate or responsive to detecting a disengagement event (e.g., the temperature satisfying the temperature threshold, the duration satisfying the duration threshold, and/or the discharge pressure falling outside the pressure range). To cause disengagement of the slip device 250, the controller 224 may cause depressurization of the impeller clutch control 228 for the impeller clutch 222 (e.g., dropping the pressure to zero). In connection with exiting the pressure test mode, the controller 224 may also cause (e.g., via the engine control 234) the engine 206 to return to an idle speed.

As indicated above, FIG. 2 is provided as an example. Other examples may differ from what is described with regard to FIG. 2.

Figure 3:
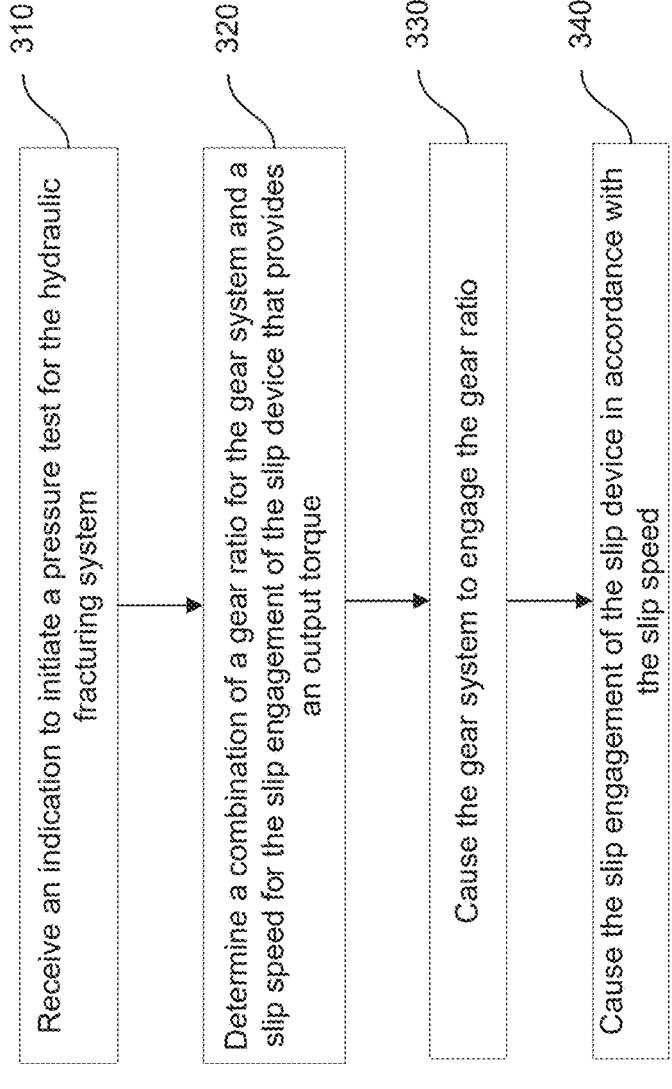
FIG. 3 is a flowchart of an example process associated with pressure testing a hydraulic fracturing system.

FIG. 3 is a flowchart of an example process 300 associated with pressure testing the hydraulic fracturing system 100. One or more steps of process 300 may be performed by the controller 224, alone or in combination with one or more additional controllers (e.g., controller 130 and/or pump controller 236). Additionally, or alternatively, one or more steps of process 300 may be performed by another device or a group of devices separate from or including the controller 224, such as another device or component that is internal or external to the pump system 200.

At step 310, process 300 may include receiving an indication to initiate a pressure test for the hydraulic fracturing system 100. As described herein, the controller 224 may enter the pressure test mode responsive to the indication, and the indication may include a torque request indicating an output torque for the pressure test. For example, the torque request may be based on a target pressure indicated for the pressure test.

The controller 224 may enter the pressure test mode provided that one or more conditions for entering the pressure test mode are satisfied. These conditions may include a condition that the lockup clutch 220 is disabled and/or disengaged, a condition that the engine 206 is running, a condition that the engine 206, the transmission system 204 or a component thereof, and/or the pump 202 is not in a drive state, a condition that the gear system 230 is in park or neutral, a condition that an operator-commanded gear for the gear system 230 is park or neutral, a condition that the engine output speed is at or near an idle speed, a condition that the engine output speed is at least an idle speed minus a deviation value, a condition that the gear system 230 is not in a cold mode, a condition that an oil temperature (e.g., in the engine 206) is greater than a lower limit value, a condition that a torque converter oil temperature is less than an upper limit, a condition that an impeller speed is within a deviation value of an engine output speed, and/or a condition that no faults are detected for sensors and/or controls of the pump system 200, among other examples.

Upon entering the pressure test mode, the controller 224 may cause the performance of one or more actions to ready the pump system 200 for the pressure test. For example, the controller 224 may cause a park to neutral shift for the gear system 230 and may cause depressurization of the impeller clutch control 228 for the impeller clutch 222 (e.g., dropping the pressure to zero), which may be performed to build as little pressure as possible before going into gear. The controller 224 may then set a timer, and may refrain from performing additional actions until an expiration of the timer to allow the impeller clutch control 228 to fully drain. After expiration of the timer, the controller 224 may set an additional timer, and the controller 224 may commence pressurization for the pressure test upon receiving an operator input indicating a gear command for the gear system 230 (e.g., a command to put the gear system 230 into gear) before expiration of the additional timer. The controller 224 may exit the pressure test mode if no gear command is received before expiration of the additional timer.

Moreover, the controller 224 may exit the pressure test mode if one or more conditions for exiting the pressure test mode are satisfied. These conditions may include a condition that the pressure test mode has been disabled (e.g., by an operator), a condition that the pressure test mode has completed, a condition that the engine is not running, a condition that the engine 206, the transmission system 204 or a component thereof, and/or the pump 202 is in a drive state, a condition that an oil temperature (e.g., in the engine 206) is greater than an upper limit value, a condition that a torque converter oil temperature is greater than an ultimate upper limit value, a condition that a fault is detected for a sensor and/or a control of the pump system 200, a condition that an operator-commanded gear for the gear system 230 is less than first gear or is neutral, park, or stall, and/or a condition that the target pressure and/or the output torque used for the pressure test has been updated, among other examples.

At step 320, process 300 may include determining a combination of a gear ratio (e.g., a target gear) for the gear system 230 and a slip speed for the slip engagement of the slip device 250 that provides the output torque. For example, for each gear ratio of the gear system 230, the controller 224 may compute a transmission input torque based on the output torque and the gear ratio (e.g., transmission input torque for a gear ratio=transmission output torque÷the gear ratio). In addition, for each gear ratio, the controller 224 may compute an impeller speed at stall conditions based on the transmission input torque, a primary torque for the torque converter 208, and a torque ratio for the torque converter 208. Furthermore, for each gear ratio, the controller 224 may compute (e.g., using a torque estimation model) a slip speed based on the impeller speed and the transmission input torque. Thus, for each gear ratio, the controller 224 may derive a set of values indicating a transmission input torque, an impeller speed, and an impeller slip speed. Based on the set of values for each gear ratio, the controller 224 may select either the lowest or the highest gear ratio (e.g., a configuration may indicate whether lowest or highest is to be selected) associated with a slip speed above a lower bound and below an upper bound.

At step 330, process 300 may include causing the gear system 230 to engage the gear ratio. For example, the controller 224 may provide a command to the gear system control 232 to cause the gear system 230 to engage the gear ratio. After doing so, the controller 224 may set a timer to allow time for the gear ratio to fully engage. After expiration of the timer, the controller 224 may cause commencement of a ramp up of the engine 206 (e.g., the engine 206 may be commanded to high idle after engaging the gear ratio to meet emission standards).

The controller 224 may then cause adjustment of a pressure of the impeller clutch control 228 to a minimum unlock pressure for the impeller clutch 222 (e.g., a minimum unlock pressure indicated by a table or a mapping). This may cause refilling of the impeller clutch control 228 for the impeller clutch 222 in a single step. The controller 224 may also cause (e.g., via a speed command to the engine control 234) the engine speed to increase to an operating speed used to drive the pump 202 (e.g., an operating speed used for hydraulic fracturing pumping).

At this point, the controller 224 may allow the hydraulic fracturing system 100 (e.g., the fluid conduits of the hydraulic fracturing system 100) to fill with fluid. The controller 224 may wait for a stall indicated by the transmission output speed becoming zero, which occurs if the hydraulic fracturing system 100 fills within a first time window, and the controller 224 may determine to continue the pressure test. Otherwise, if the transmission output speed is not zero within the first time window, then the controller 224 may wait for the hydraulic fracturing system 100 to fill within a second time window. The controller 224 may exit the pressure test mode after the second time window, such as when the transmission output speed becomes zero. Before proceeding further with the pressure test, the controller 224 may wait (e.g., while monitoring a temperature at the impeller clutch 222) for the impeller clutch 222 to cool (e.g., fall below a threshold), thereby ensuring that the impeller clutch 222 does not heat excessively while the hydraulic fracturing system 100 fills with fluid. If a further fill cycle is needed, the controller 224 may exit the pressure test mode.

The controller 224 may determine to proceed with the pressure test upon the engine speed approaching the operating speed (e.g., the engine speed is within a deviation value of the operating speed). It may take the engine 206 a significant amount of time to reach its operating speed (e.g., about 1800 rpm). Accordingly, control of the impeller clutch control 228 for the impeller clutch 222, as described below, may begin before the engine 206 fully reaches the operating speed. The controller 224 may exit the pressure test mode if the engine 206 does not reach the target operating speed within a particular time window.

At step 340, process 300 may include causing the slip engagement of the slip device 250 in accordance with the slip speed. For example, the controller 224 may cause pressure to the impeller clutch control 228 for the impeller clutch 222 to be increased and/or decreased using an integrator-based control targeting the slip speed. In the pressure test mode, the controller 224 may reset the integrator control to unlock the impeller clutch pressure upon initialization, as described above. As described herein, the controller 224 may cause decreasing in an actual slip speed to the target slip speed over multiple stages. For example, for each stage, the controller 224 may reset the integrator control to a last pressure command value multiplied by a constant scaling factor to provide pulsing of the impeller clutch pressure, as described below.

As an example, in a first stage, the controller 224 may cause the target slip speed to be overshot by a first overage using the integrator control (e.g., a higher slip speed corresponds to a lower absolute impeller speed, resulting in lower generated torque in the torque converter 208 and therefore lower pressure from the pump 202). The controller 224 may initiate a timer for the first stage. The controller 224 may determine whether the timer exceeds a minimum duration and whether the actual slip speed is within a deviation value of the first stage slip speed. In some examples, the controller 224 may determine whether a speed error (e.g., a difference between an actual slip speed and the first stage slip speed) exceeds the first stage slip speed by a threshold. Responsive to the timer exceeding the minimum duration and the actual slip speed being within the deviation value of the first stage slip speed, or responsive to the speed error exceeding the first stage slip speed by the threshold, the controller 224 may reset the integrator control using a current integrator value multiplied by a scaling factor and proceed to the next stage.

In a second stage, the controller 224 may cause the target slip speed to be overshot by a second lesser overage using the integrator control. The controller 224 may initiate a timer for the second stage. The controller 224 may determine whether the timer exceeds a minimum duration and whether the actual slip speed is within a deviation value of the second stage slip speed. In some examples, the controller 224 may determine whether a speed error (e.g., a difference between an actual slip speed and the second stage slip speed) exceeds the second stage slip speed by a threshold, which represents an unexpected pressure overshoot. Responsive to the timer exceeding the minimum duration and the actual slip speed being within the deviation value of the second stage slip speed, or responsive to the speed error exceeding the second stage slip speed by the threshold, the controller 224 may reset the integrator control using a current integrator value multiplied by a scaling factor and proceed to the next stage. The first stage and the second stage allow pressure to build slowly in the hydraulic fracturing system 100 below the target pressure, and provide opportunities for the pressure test to be aborted before the target pressure is reached.

In a third (final) stage, the controller 224 may use the target slip speed for the integrator control. The controller 224 may initiate a timer for the third stage. The controller 224 may determine whether the timer exceeds a minimum duration and whether the actual slip speed is within a deviation value of the target slip speed. In some examples, the controller 224 may determine whether a speed error (e.g., a difference between an actual slip speed and the target slip speed) exceeds the target slip speed by a threshold. Responsive to the timer exceeding the minimum duration and the actual slip speed being within the deviation value of the target slip speed, or responsive to the speed error exceeding the target slip speed by the threshold, the controller 224 may reset the integrator control using a current integrator value multiplied by a scaling factor. The controller 224 may repeat this process one or more times in the third stage to promote higher pressure from the pump 202.

During the third stage, the controller 224 may compare the timer to an abort timer, that is initiated at the start of the first stage, and is based on a mapping lookup versus the gear ratio and the output torque. The abort timer is defined to predict when the impeller clutch 222 would reach a temperature threshold based on the amount of time that the impeller clutch 222 is under closed-loop control. Accordingly, the controller 224 may abort the third stage and/or exit the pressure test mode based on a value of the abort timer (e.g., the value exceeding a threshold, or a relationship between the value and the third stage timer).

The controller 224 may exit the pressure test mode if one or more conditions for exiting the pressure test mode are satisfied, as described above. For example, the controller 224 may exit the pressure test mode if an operator-commanded gear for the gear system 230 is neutral, an exit condition (e.g., relating to a temperature of the impeller clutch 222 or the abort timer) is satisfied, and/or disengagement of the lockup clutch 220 is disabled, among other examples.

To prepare for exiting the pressure test mode, the controller 224 may cause (e.g., via a speed command to the engine control 234) the engine speed to return to the idle speed and/or cause depressurization of the impeller clutch control 228 for the impeller clutch 222 (e.g., dropping the pressure to zero). The controller 224 may then initiate a cooldown timer, and set a stage timer to allow time for the engine speed and impeller clutch pressure to decay. After expiration of the stage timer, the controller 224 may cause a shift to neutral for the gear system 230. At this point, the impeller clutch pressure may ramp up from a current pressure command to an engagement pressure at a defined ramp rate. After the cooldown timer exceeds a minimum duration (e.g., defined by a table or a mapping and based on an accumulated impeller clutch energy), the controller 224 may exit the pressure test mode and normal operation of the pump system 200 may be resumed.

The controller 224 may compute accumulated impeller clutch power and/or energy based on impeller clutch relative speed, impeller clutch command pressure, impeller speed, and/or engine output speed. Accumulated impeller clutch energy represents the total energy put into the impeller clutch 222 and indicates an estimated amount of time needed to cool the impeller clutch 222 following the pressure test. For example, the controller 224 may determine the cooldown time using a table or a mapping and based on the accumulated impeller clutch energy. In this way, momentarily performing a pressure test would not force an extended waiting period for cooldown. The controller 224 may compute the impeller clutch power as the product of the absolute value of the impeller clutch relative speed, an impeller clutch friction coefficient (e.g., based on impeller clutch net unit pressure and impeller clutch relative speed), a net impeller clutch pressure, and an overall energy scale factor. From the impeller clutch power, the controller 224 may compute the accumulated impeller clutch energy as the product of the impeller clutch power and the loop time of the controller 224, summed with a previous impeller clutch power computation.

Although FIG. 3 shows example steps of process 300, in some implementations, process 300 may include additional steps, fewer steps, different steps, or differently arranged steps than those depicted in FIG. 3. Additionally, or alternatively, two or more of the steps of process 300 may be performed in parallel.

INDUSTRIAL APPLICABILITY

The pump system 200 described herein may be used with any hydraulic fracturing system or other system that pressurizes fluids. For example, the pump system 200 may be used to perform a pressure test of a hydraulic fracturing system, which is useful for detecting leaks or other defects in the hydraulic fracturing system. The pump system 200 can employ a gaseous fuel engine, and enables the use thereof in pressure testing a hydraulic fracturing system. Generally, in hydraulic fracturing applications, a gaseous fuel engine is used to power a generator, which in turn powers an electric motor used to drive a hydraulic fracturing pump. However, in the pump system 200, the gaseous fuel engine is mechanically coupled to a hydraulic fracturing pump. Unlike diesel engines, gaseous fuel engines in this type of mechanical configuration, are generally unable to control powertrain output torque, in accordance with a target pressure for a pressure test, due to having only single speed capability.

The pump system 200 described herein enables control of output torque using a slip device 250. In particular, the pump system 200 may employ a gaseous fuel engine mechanically coupled to a hydraulic fracturing pump, and the slip device 250 provides control of the output torque through varying a slip speed of a slip engagement of the slip device 250, as described herein. In this way, the pump system 200, employing a gaseous fuel engine, can be used in a pressure test of a hydraulic fracturing system, thereby enabling the detection of leaks or other defects in the hydraulic fracturing system. Moreover, by using a gaseous fuel engine, rather than a diesel engine, the pump system 200 achieves lower emissions and lower fuel costs.

What is claimed is:

1. A hydraulic fracturing system, comprising:
   one or more fluid conduits; and
   a hydraulic fracturing pump system fluidly coupled to the one or more fluid conduits, the hydraulic fracturing pump system comprising:
     a hydraulic fracturing pump;
     a gaseous fuel engine configured to drive the hydraulic fracturing pump;
     a torque converter comprising an impeller clutch that selectively couples the hydraulic fracturing pump with the gaseous fuel engine;
     a gear system mechanically coupled to the hydraulic fracturing pump between the hydraulic fracturing pump and the torque converter; and
     a controller configured to cause, in connection with a pressure test for the hydraulic fracturing system, a slip engagement of the impeller clutch to control an output torque to, and a discharge pressure of, the hydraulic fracturing pump.

2. The hydraulic fracturing system of claim 1, wherein the controller, to cause the slip engagement of the impeller clutch, is configured to:
   control a pressurization of an impeller clutch control for the impeller clutch in accordance with a slip speed.

3. The hydraulic fracturing system of claim 1, wherein the controller is further configured to:
   determine a combination of a gear ratio for the gear system and a slip speed for the slip engagement that provides the output torque; and
   cause the gear system to engage the gear ratio.

4. The hydraulic fracturing system of claim 3, wherein the controller, to determine the combination of the gear ratio and the slip speed, is configured to:
   determine a plurality of combinations of gear ratios and slip speeds that provide the output torque;
   identify one or more combinations, of the plurality of combinations, having slip speeds that fall within a defined speed range; and
     select the combination of the gear ratio and the slip speed from the one or more combinations.

5. A hydraulic fracturing pump system, comprising:

a hydraulic fracturing pump;

a gaseous fuel engine configured to drive the hydraulic fracturing pump;

a slip device selectively coupling the hydraulic fracturing pump with the gaseous fuel engine;

a gear system mechanically coupled to the hydraulic fracturing pump between the hydraulic fracturing pump and the slip device; and a controller configured to cause, in connection with a pressure test for a hydraulic fracturing system that includes the hydraulic fracturing pump system, a slip engagement of the slip device to control an output torque to, and a discharge pressure of, the hydraulic fracturing pump.

6. The hydraulic fracturing pump system of claim 5, wherein the controller is further configured to:

receive, from a controller of the hydraulic fracturing pump, a torque request indicating the output torque, wherein the torque request is based on a target pressure for the pressure test.

7. The hydraulic fracturing pump system of claim 5, wherein the controller is further configured to:

receive an indication of a target pressure for the pressure test; and determine the output torque based on the target pressure.

8. The hydraulic fracturing pump system of claim 5, wherein the controller is further configured to:

receive an indication to initiate the pressure test for the hydraulic fracturing system;

cause, responsive to the indication, a park to neutral shift of the gear system; and cause, responsive to the indication, disengagement of the slip device.

9. The hydraulic fracturing pump system of claim 5, wherein the controller, to cause the slip engagement of the slip device, is configured to:

determine a combination of a gear ratio for the gear system and a slip speed for the slip engagement that provides the output torque;

cause the gear system to engage the gear ratio; and cause the slip engagement of the slip device in accordance with the slip speed.

10. The hydraulic fracturing pump system of claim 9, wherein the slip speed represents a change in speed across the slip device.

11. The hydraulic fracturing pump system of claim 9, wherein the controller, to determine the combination of the gear ratio and the slip speed, is configured to:

determine a plurality of combinations of gear ratios and slip speeds that provide the output torque;

identify one or more combinations, of the plurality of combinations, having slip speeds that fall within a defined speed range; and select the combination of the gear ratio and the slip speed from the one or more combinations.

12. The hydraulic fracturing pump system of claim 5, wherein the slip device is an impeller clutch of an impeller of a torque converter.

13. The hydraulic fracturing pump system of claim 12, wherein the controller, to cause the slip engagement of the slip device, is configured to:

control a pressurization of an impeller clutch control for the impeller clutch.

14. The hydraulic fracturing pump system of claim 5, wherein the controller is further configured to:

detect that a temperature of the slip device satisfies a temperature threshold or that a duration of the slip engagement of the slip device satisfies a duration threshold; and cause disengagement of the slip device based on detecting that the temperature of the slip device satisfies the temperature threshold or that the duration of the slip engagement satisfies the duration threshold.

15. The hydraulic fracturing pump system of claim 5, wherein the controller, to cause the slip engagement of the slip device, is configured to:

cause the slip engagement of the slip device in multiple stages of decreasing slip speed to provide, over the multiple stages, increasing of the output torque and the discharge pressure up to a target pressure of the pressure test.

* * * * *